April 10, 1945.   O. W. STONE   2,373,428
INSECT KILLER
Filed July 21, 1941   5 Sheets-Sheet 1
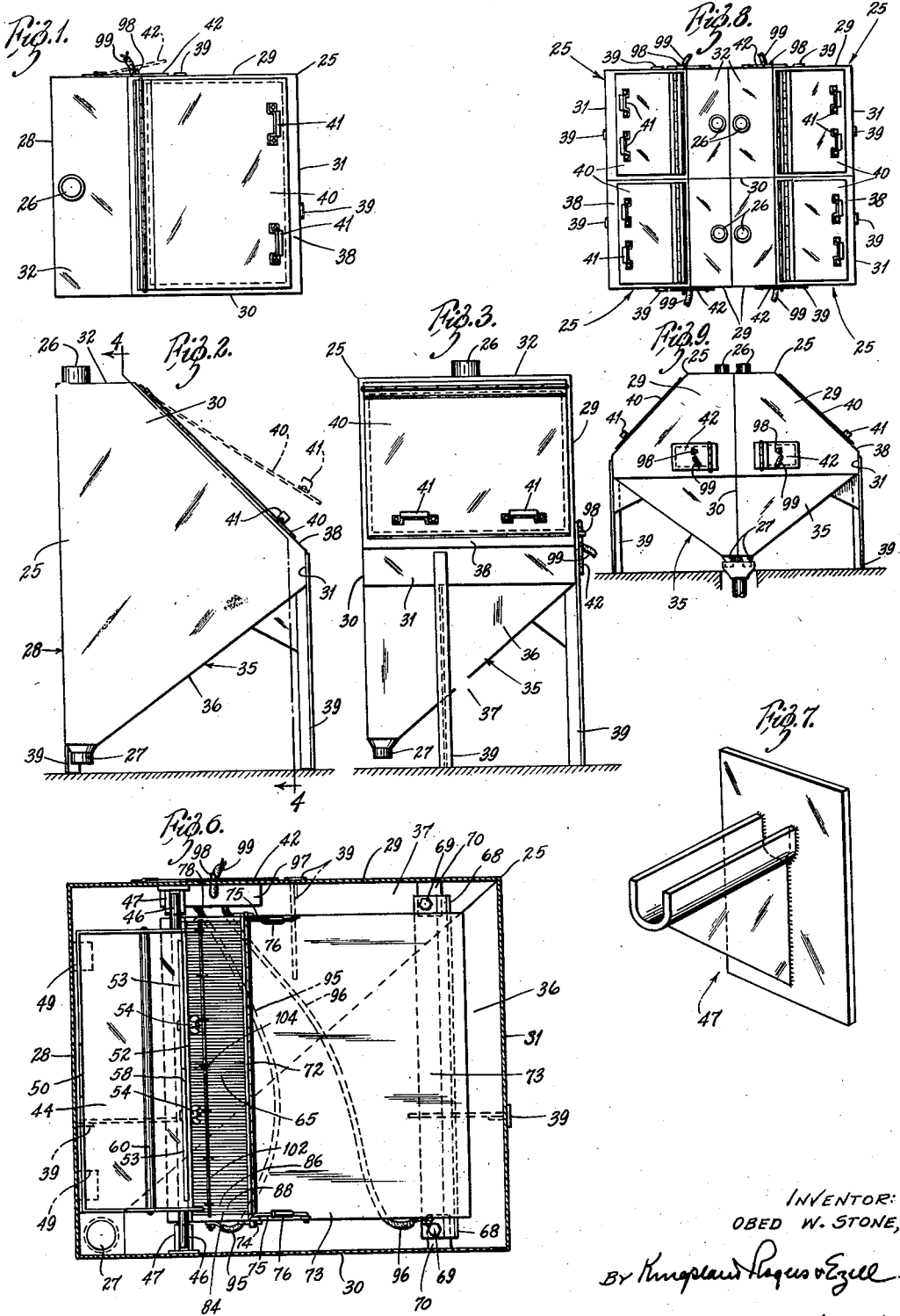
INVENTOR:
OBED W. STONE,
By Kingsland Rogers & Ezell
ATTORNEYS.

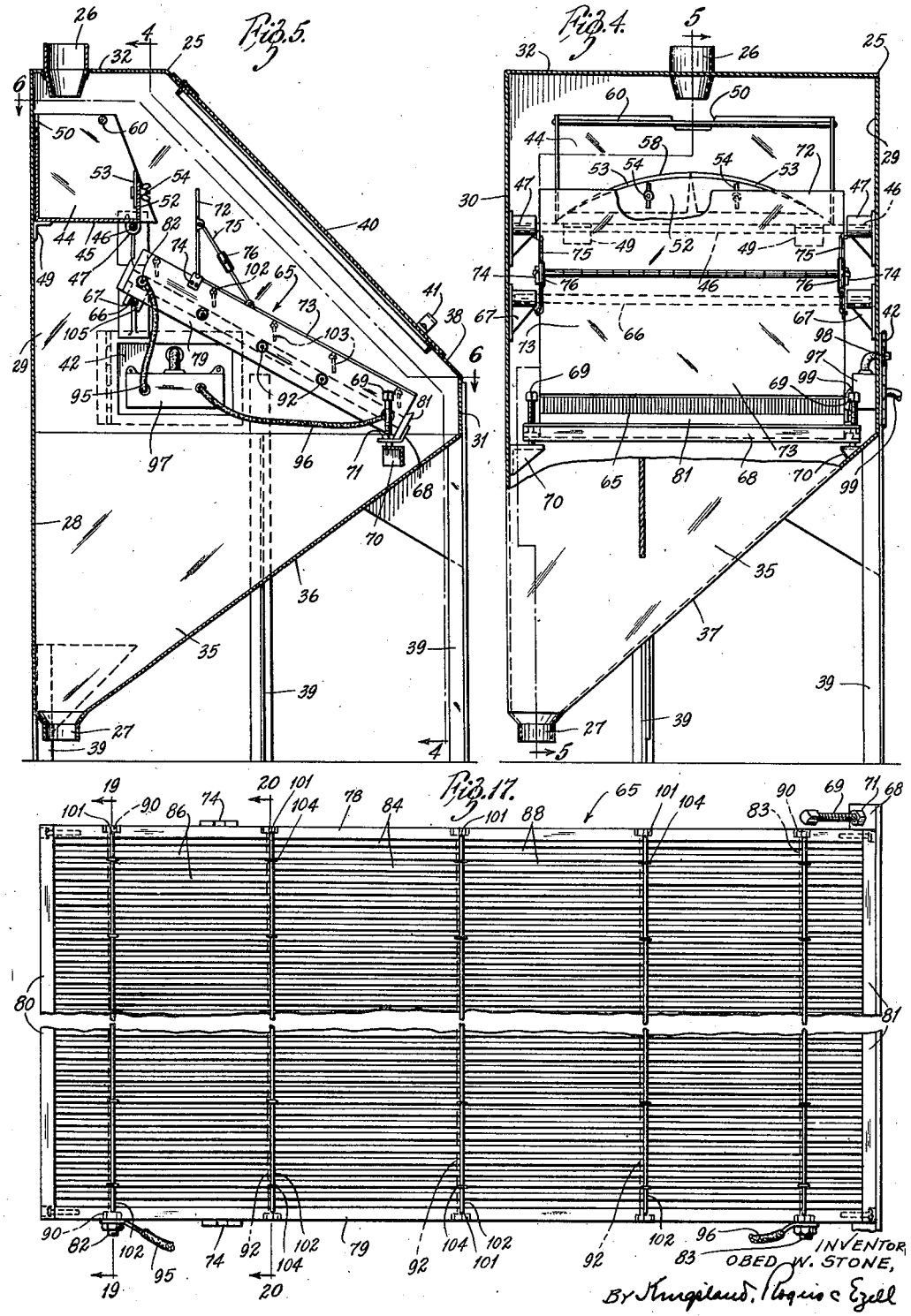

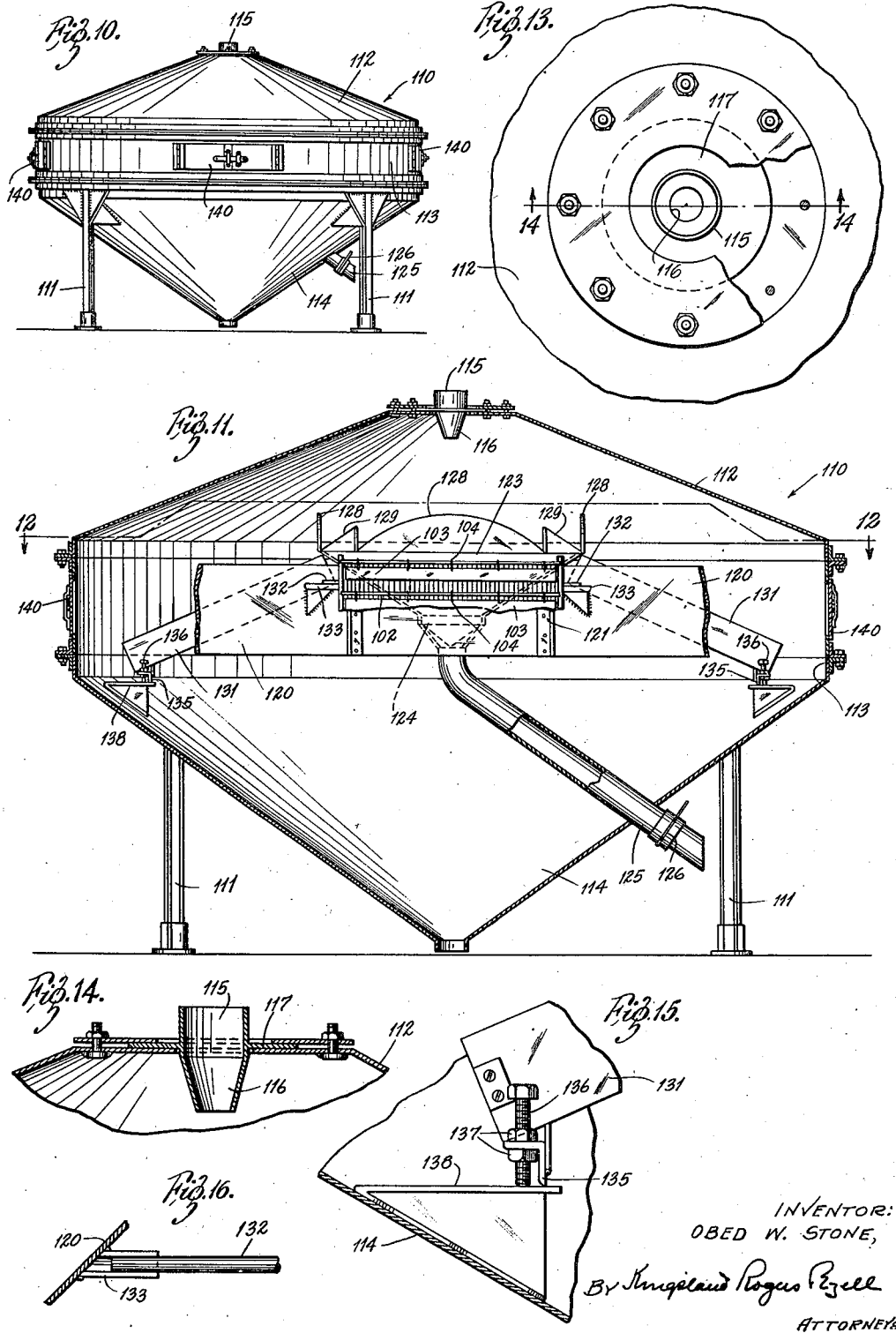

April 10, 1945.   O. W. STONE   2,373,428
INSECT KILLER
Filed July 21, 1941   5 Sheets-Sheet 4
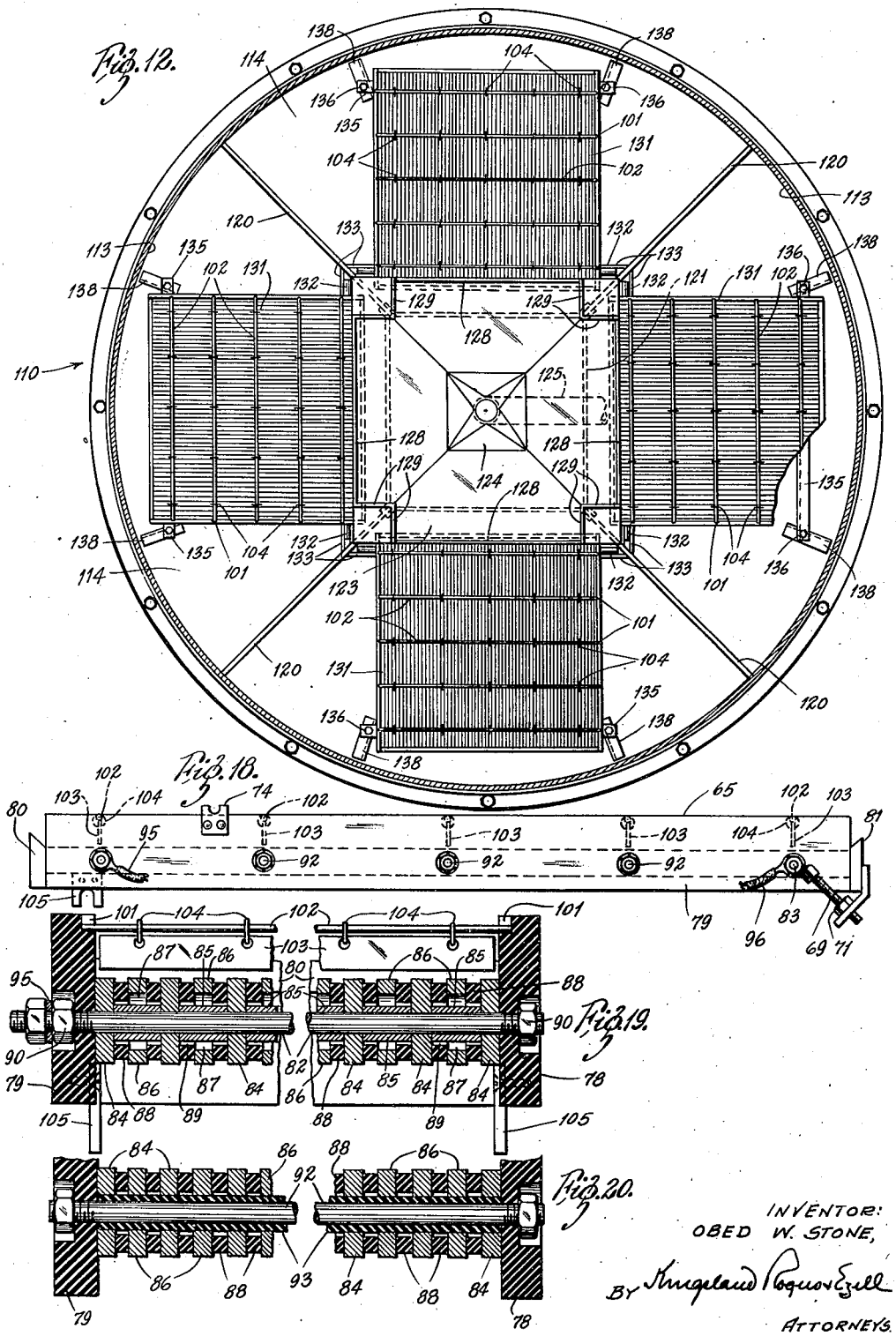
INVENTOR:
OBED W. STONE,
By Kingsland Roquemore Ezell
ATTORNEYS

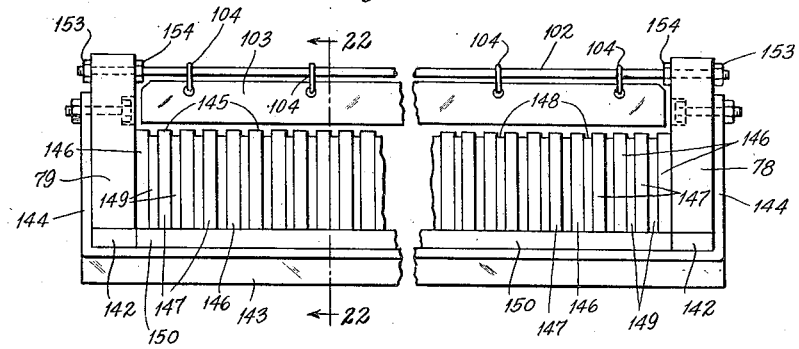
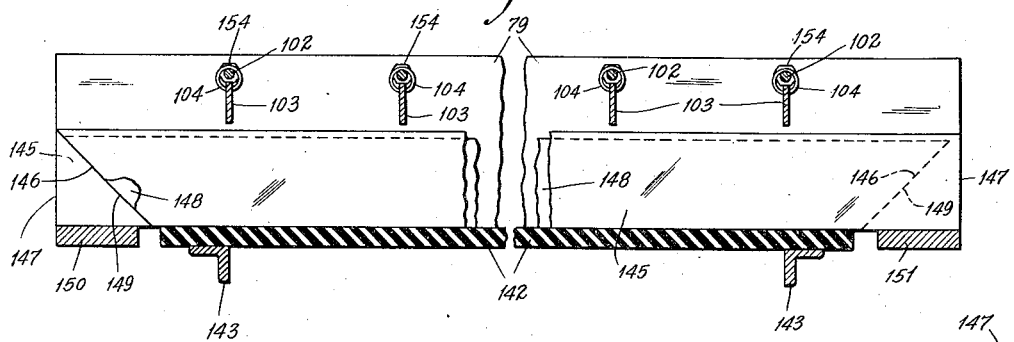
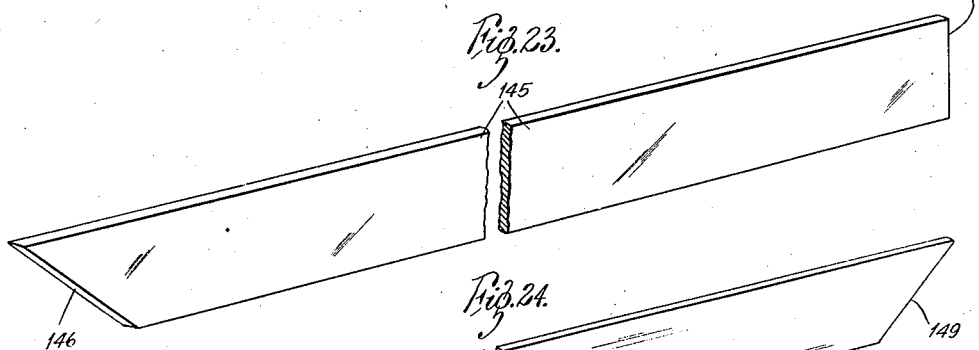
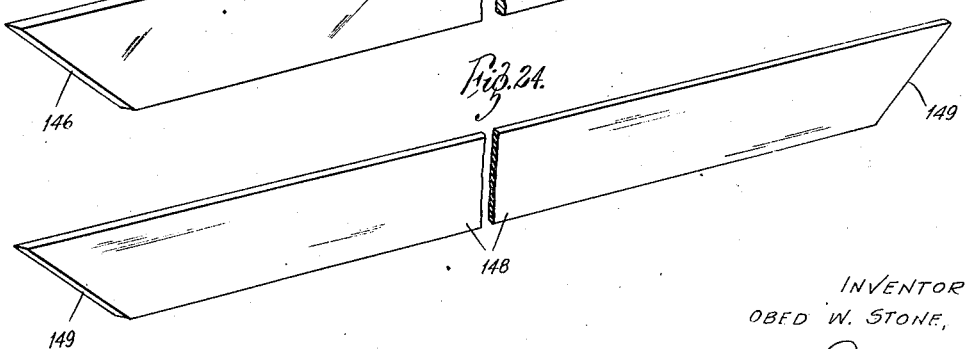

Patented Apr. 10, 1945

2,373,428

UNITED STATES PATENT OFFICE 2,373,428

INSECT KILLER

Obed W. Stone, Webster Groves, Mo.

Application July 21, 1941, Serial No. 403,309

17 Claims. (Cl. 21—102)

The present invention relates to a machine for killing free living insects in a moving stream of crop products, such as grain.

The problem of insect content in bulk grain in mills and storage bins is a very serious one. The present machine is directed primarily to free living insects rather than those that are inside the grain hulls.

Anything that delays or stops the flow of grain in a mill is so disadvantageous from the cost standpoint, as well as the standpoint of the integrated mill operation, as to be almost unsalable. In many mills the stream flows as high as several hundred bushels per minute. It is, of course, highly desirable that the grain be free not only of insects, but also from their excreta.

An object of the present invention is to provide a means for killing insects in a flowing stream of material without slowing or stopping the stream, and without causing crushing of the insects or distribution of their excreta into the grain.

A further object is to provide an electrical means for doing this in an efficient manner.

Other objects include the provision of a machine of this character, the parts of which are readily accessible for servicing; to provide a machine of this character that is adapted to be inserted into a flowing stream.

A further object is to provide a flexible unit that may be combined with other smaller units so that combinations may be made to accommodate streams of varying quantities.

Further objects are to provide an electrical insect killing means having means to receive material such as grain in a stream, to distribute the stream evenly over an electric grid or a plurality of them, and preferably a grid of novel construction shown, to dispose the grids so that substantially all insects invariably will be exposed to electric current and may be killed, while at the same time the grain is caused to flow into a discharge outlet to continue its progress in a stream. In accomplishing the foregoing, it is also an object to provide novel means to obtain even distribution of the material across the grids.

In this description, the application of the invention to a stream of grain in a mill is used for illustration. It will be understood that the invention is not limited to grain, but may be used with any mass of relatively small particles, such as corn, coffee, rice, beans, berries, and the like; and it also may be used in any flowing stream, as from a bin, a car, a boat, a granary, an elevator, or the like.

In the drawings:

Fig. 1 is a plan view of the principal form of the device;

Fig. 2 is a side elevation thereof;

Fig. 3 is a front elevation;

Fig. 4 is a vertical section across the front taken on the line 4—4 of Figs. 2 and 5;

Fig. 5 is a vertical section from front to rear of the device, taken on the line 5—5 of Fig. 4;

Fig. 6 is a horizontal section taken on the line 6—6 of Fig. 5;

Fig. 7 is a view of a hinge channel;

Fig. 8 is a plan view of a battery of units;

Fig. 9 is an elevational view of the battery of units;

Fig. 10 is a front elevation of a modification;

Fig. 11 is a vertical section on a plane from side to side of the device as it appears in Fig. 10;

Fig. 12 is a horizontal section on line 12—12 of Fig. 11;

Fig. 13 is a view of the inlet at the top of the device;

Fig. 14 is a vertical section of the inlet taken on the line 14—14 of Fig. 13;

Fig. 15 is an enlarged view, partly in section, of a lower adjustable grid support;

Fig. 16 is a view of one of the pivotal supports for the grid member in the mechanism of Fig. 12;

Fig. 17 is a top view of one of the grids;

Fig. 18 is an end view of a grid;

Fig. 19 is a section through the grid taken on the line 19—19 of Fig. 17;

Fig. 20 is a section through the grid taken on the line 20—20 of Fig. 17.

Fig. 21 is a partial view of a grid construction of modified form;

Fig. 22 is a section through the modified grid, taken on line 22—22 of Fig. 21;

Fig. 23 is a view of a conductor element of the modified grid; and,

Fig. 24 is a view of an insulator element of said modified grid.

The preferred form of the invention includes a housing 25 having an inlet 26 and an outlet 27. The housing has a back wall 28, side walls 29 and 30, a short vertical front wall 31, and a top wall 32. The lower parts of the back wall 28 and one side wall 30 form two sides of a discharge funnel, generally indicated at 35. The other two sides are formed by sloping side 36 leading from the outlet 27 to the front wall 31 and the sloping wall 37 leading from the outlets 27 to the side wall 29.

A sloping wall 38 completes the front of the device by joining the short front wall 31 with the top 32. The unit as a whole is supported by suitable legs 39. On the sloping front wall 38 is a door 40 hinged with a piano hinge at the top and having suitable handles 41 by means of which it may be opened to give access to the interior. There is also a side door 42 in the wall 29 giving additional access, as will be described.

Preferably, the inlet 26 is of a size to permit a certain maximum quantity of grain to the container. Immediately below the inlet is a dead box 44. This dead box consists of a trough-like member having a bottom wall 45 supported upon a rod 46, the ends of which rest in channel supports 47 secured to the side walls 29 and 30. The rod 46 is disposed toward the front of the dead box so that gravity acts to rotate it counterclockwise as it approaches the position shown in Fig. 5. A bracket 49 attached to the back wall 28 acts as a stop to limit this rotation.

The dead box is provided with back and end walls, the back wall being notched at 50 so that the box may be pivoted about the rod 46 without striking the inlet 26.

The front wall 52 of the dead box is curved and is provided with supplemental plates 53 adjustably secured thereto with slot and bolt connections 54. The upper edge 58, provided by the combined upper curved edges of the supplemental plates 53, is designed to give an even distribution of grain flowing over it from one end to the other of the dead box. It is designed to take into consideration the fact that the grain discharged from the inlet to the dead box assumes a somewhat conical form and that the edge 58 represents the intersection of the plane and the cone. Proper adjustments of this front edge may be made by individually adjusting the supplemental front walls 53.

A rod 60 extends across the top of the dead box. It may be reached through the door 40 and is employed for upturning the dead box by pivoting it about the rod 46.

Below the dead box, a grid 65 is disposed. This grid will be described in detail hereafter. Suffice it at this time to state that it is rectangular in outline and extends across the container substantially from side to side thereof. The upper end or edge is beneath the front edge of the dead box and is supported there by a cross rod 66 similar to the cross rod 46 and similarly supported for pivotal movement in brackets 67 attached to the side walls. Within this frame is disposed the grid proper.

The lower front edge of the grid has an angle iron 68 attached thereto and extending thereacross and somewhat beyond the lateral limits thereof. Beyond the said lateral limits, each end of this angle iron has an adjusting screw 69 extending therethrough and engaging a bracket 70 attached to the side wall of the container. Suitable lock nuts 71 are provided.

By the foregoing means, it will be seen that the grid may be adjusted by means of the screws 69 so as to have the proper angle relative to the horizontal that will provide proper flow of the grain with a maximum speed consistent with proper grid action upon the insects in the grain. A typical angle is 27° for grain, although this angle might not be the most satisfactory either for all grain or for other material.

A baffle plate 72 is hinged to a grid cover 73 as by a piano hinge. The ends of the hinge pintle project to engage in slotted brackets 74 in the sides of the grid frame, whereby the unit is held in place. A brace 75 with a suitable elbow joint 76 is adapted to hold this baffle plate in a vertical position where it will deflect material falling over the edge of the dead box onto the upper part of the grid. The baffle thus assists in ensuring that the grain will contact the grid for the proper distance.

The grid itself may be of the type shown in Figs. 17-20, or the type of Figs. 21-24. The first type is formed in a frame of insulating material consisting of side edges 78 and 79, a top edge 80, and a bottom edge 81. Between the top edge 80 and the bottom edge 81 are a plurality of electrodes, adjacent ones being of opposite polarity and all of them individually insulated by suitable insulator strips.

There are two conductors 82 and 83 that extend through from one side wall 79 to the other one 78, and which are designed to conduct electricity to alternate laminations. Of course, the laminations in contact with the conductor 82 are not in contact with the conductor 83.

The conductor 82 is shown in Fig. 19. Alternate grid conductors 84 are in direct contact with the conductor rod 82, by its passing through them. They are held in proper spacing from each other by spacer collars 85.

The alternate conductors 86 are provided with large holes 87 that receive the conductor rod 82 and the collars 85 with a considerable space so that there is no contact between them.

Between adjacent conductors are insulating laminations 88, also provided with holes 89 to receive the conductor 82 and the spacer collars 85. Nuts 90 at opposite ends of the conductor 82 are turned down to clamp the various elements between the side walls 78 and 79.

It will be understood that the conductor 83 is in contact with the grid elements 86 and insulated from the elements 84 by an assembly like that shown in Fig. 19.

Intermediate bracing rods 92, having insulating sleeves 93 extending from end to end thereof, are provided at proper intervals, as shown in Fig. 20. They are insulated from all of the grid elements.

By this construction, the upper surface of the grid member consists of alternately polarized grid elements spaced one from another by a small distance by means of insulating laminations. It will be seen that the grid elements project a slight distance above the adjacent insulators which enhance the quality of contact within insets.

To the member 82 is connected an electrical lead 95 and a similar lead 96 is connected to the member 83. These two leads are carried to a transformer 97 secured to and supported on the side door 42. The leads are, of course, flexible to permit the door to be opened. A main switch 98 is mounted on the outside of the door for turning the grids on or off. A suitable connection 99 also leads from the transformer to a source of electrical power.

The side walls 78 and 79 project above the grid elements. At suitable intervals they are provided with notches 101 extending downwardly from their top edges to support the ends of rods 102 extending across the grid. Baffles 103 are suspended from the rods 102 for free swinging movement by rings 104. These baffles spread the material thinly over the grid.

Opposite saddle brackets 105 are secured to the side walls to engage over the rod 66 and to hold the grid pivotally in place, in cooperation with the screws 69.

The operation of this type of insect killer is as follows: The inlet 26 is connected at a suitable point in the flow line of the grain in the elevator or mill. Grain flows through the inlet into the dead box where it piles up until it flows over the front edge 58 thereof. The elements making up the front wall are shaped so that there is an even flow of grain over the edge from end to end of the box.

That grain discharged from the dead box falls to the grid 65. The baffle plate 72 and the cover plate prevent escape of any grain. The grain thereupon falls at the proper rate by gravity from the upper end to the lower end of the grid, being kept in a thin layer by the baffles 103. In so doing it passes over the oppositely charged grid elements. Insects bridging the gap between these elements conduct the current from element to element and thereby become electrocuted. The elements project above the insulated strips to cause a greater likelihood of contact.

The grain then discharges over the lower end of the grid into the funnel 35 wherein it falls to the outlet 27 and continues in the grain stream. However, the insects will be found to have been substantially all electrocuted and capable of being removed at a later stage.

As to the adjustment of the device, the elements 53 on the front wall of the dead box are individually adjusted to ensure the even discharge of grain over this front edge. The angularity or slope of the grid is subject to adjustment by the screw 69, as described.

When it is desired to clean out or service the machine, the front door 40 may be lifted and the dead box drawn over about the rod 46 to discharge the contents. It likewise may be lifted out completely.

The baffle 72 may be lowered by breaking the elbow joint 76, and the baffle plate and cover plate may be removed by lifting from the grid. The grid itself may be removed, in the obvious manner, through the door 40.

For electric servicing, the door 42 gives immediate access to the transformer and switch connections, as well as the leads that go to the grid connections.

One of the particular advantages of this style is that with one style of unit four different capabilities can be obtained. A battery of four may be set up, as shown in Figs. 8 and 9, or any number between that and one may be used. This is of particular advantage, since the requirement for a machine exists in mills of widely varying capacities.

A large machine of high capacity is shown in Figs. 10-15. In this machine there is a casing generally indicated at 110 supported on legs 111. The casing 110 has an upper conical portion 112 mounted on top of the middle cylindrical portion 113 and having a lower inverted conical-shaped funnel 114.

At the apex of the upper section 112 is the inlet 115. This inlet tapers at its bottom portion, as shown at 116, to restrict the quantity of grain flowing through it to a desired amount. The inlet is provided with a flange 117 that is clamped to the top of the conical portion 112 in the manner shown in Fig. 14. This clamp is removable so that inlets of different capacities may be employed, if desired.

The cylindrical section 113 has extending radially therein four supporting braces 120. These braces, at their inner ends, are secured to a square framework 121 providing a support for the mechanism within the container.

The dead box generally indicated at 123 in this type of machine has a funnel-shaped bottom 124 that leads to an exhaust pipe 125 that passes through the wall of the bottom portion 114 and has a cut-off valve 126 therein. Normally, the valve 126 is closed.

The dead box is generally square, and on its sides has four curved walls 128. These walls do not extend the entire distance across the sides, since the corners of the dead box are indented. The indentations are, in turn, provided with sloping walls 129 which slope downwardly so that at the point of their merger with the wall 128, both they and the wall 128 are the same low level.

The curvature of the edges of the walls 128 is such as to rovide even distribution of material across the edges. This curvature is approximately that of the intersection of a vertical plane with the cone of material that piles up beneath the inlet 115. Since the corner walls 129 extend inwardly on the cone, they must increase in height to give the same flow.

Extending from under each wall 128 a grid 131 is disposed, its lateral edges extending somewhat beyond the limits of the two walls 129. These grids are in the main the same as the previously mentioned grid 65, though slightly different in proportion. At their upper ends, these grids 131 are supported upon rods 132, the opposite ends of which engage in channels 133 extending from the supporting plates 120, as is better shown in Fig. 16. Thus the grids may pivot at their upper ends or may be lifted bodily out of the channel members 133.

The lower ends of the grids 131 have angles 135 secured across the lower edge thereof. These angles project out on opposite sides of the grid, and where they project they receive adjusting screws 136 provided with suitable lock nuts 137. The screws 136, in turn, abut against plates 138, secured as by welding or the like, to the funnel member 114. Thus the angular adjustment of these grids is substantially the same as that of the previous type of machine. There are four doors 140 in the cylindrical portion 113 opposite the respective grids and through which the grids may be installed.

The operation of this modification of machine is similar to the main type. The grain flows in through the inlet 115 and into the dead box. With the valve 126 closed, the dead box will fill up until finally the grain flows over the walls 128. These walls are curved to provide an even flow across the entire length of the several walls so that the grain is divided into four equal parts and is evenly distributed from side to side of each grid onto which it falls. It then flows across the grids whereupon the insects are killed. From the lower edges of the grids, it flows into the funnel 114 and finally out the discharge outlet at the bottom thereof.

When it is desired to service this machine, the flow into it is cut off and the exhaust valve 126 is opened. This permits any grain in the dead box to flow off.

The grids and their associated mechanisms may be serviced through the several doors 140.

A different grid that has certain advantages is shown in Figs. 21-24. It has side walls 78 and 79 connected by a floor wall 142. Spaced angle irons 143 extend between the sides 78 and 79, and have their ends 144 turned up against and bolted to the sides to provide a rigid structure. The conductors 145 are formed as shown in Fig. 23, with one end 146 cut back and the other end 147 squared off. They are spaced by insulators 148 having both ends 149 cut back, the insulators preferably being of slightly less height than the conductors.

In assembling this type of grid, a conductor 145 is laid with one end 147 downward. This end will rest upon a transverse conductor or busbar 150 extending at the end between the side walls 78 and 79. A like transverse conductor 151 extends across the top. The floor 142 is cut back at its ends to accommodate the busbars. Adjacent to the conductor 145 is laid an insulator 148, its end being cut back at 149. Next to this insulator is a conductor 145, but this conductor is turned end for end so that its downward end is the cut back end 146, that does not contact the transverse conductor 150. Next is an additional insulator and adjacent it is another conductor 145 with its squared end 147 downward and in contact with the transverse conductor 150.

It will be seen that only alternate conductors are in contact with the transverse conductor or busbar 150. However, such conductors as present their cut back ends downwardly have their opposite ends in contact with the upper transverse conductor 151, which in its turn is out of contact with the conductors contacting the lower one.

By this construction, the transverse rods passing through the various laminations are eliminated. The various elements of the grid are tightly joined by cement to each other, the side walls and the floor, and each busbar is given good conducting and securing attachment with its alternate conductors, as by soldering or the like. To give an example, the conductors may be made of brass strips ½" x ⅛", and the insulator strips may be approximately ⅟₁₆" x ⁵⁰⁄₁₀₀₀".

Extending from side 78 to side 79 are bars 102 which have nuts 153 and 154 to enable the bars to act as reinforcing members. Or, as shown on the other type of grid, the bars may be dropped into slots extending partially down the sides of the grid. Several of these bars are located along the length of the grid.

Baffles 103 depend from these bars, being attached for swinging movement by rings 104. These baffles keep the grain thinned down so that all insects will be caused to come in contact with the grid, just as in the other type grid.

It will be understood that the grids may be used interchangeably. Their fittings for attachment to the machine are the same. The latter type is in some respects less expensive to make.

It will be seen from the foregoing that an efficient machine has been provided that will accomplish all of the desired results ascribed to it.

What is claimed is:

1. In a mechanism of the kind described, a container, an inlet to said container, means associated with the inlet to receive material introduced through the inlet and to distribute the same, and an electric grid means disposed below said last-named means to receive the material therefrom, said grid means being disposed at an angle so the material will flow from end to end by gravity, and said grid means comprising a base providing a floor for the material having a plurality of conductors arranged in spaced relationship to provide open circuits adapted to be closed by bridging of the space between the conductors by insects on the grain.

2. In a mechanism of the kind described for use with insect infested materials, a container, and electrical means therein adapted to have circuits closed by insects whereby said insects are electrocuted, and means causing the material to flow across the same for the insects to be electrocuted.

3. In a mechanism of the kind described, a grid comprising a plurality of elongated conductors spaced one from another and alternate ones being of like polarity with adjacent ones of opposite polarity, means supporting one end of the grid higher than the other, and means to support the grid in a stream of flowing material, including means to introduce material at the higher end and means to receive material from the lower end.

4. In a mechanism of the kind described, a grid comprising a plurality of elongated conductors spaced one from another and alternate ones being of like polarity with adjacent ones of opposite polarity, and means supporting one end of the grid higher than the other, together with insulating means between adjacent conductors and substantially coextensive therewith, the upper surfaces of said insulating means being disposed below the upper surface of the conductors.

5. In a mechanism of the kind described, a material-receiving container, an inlet into the container, receiving means for granular material, in the container, said receiving means being disposed beneath said inlet to cause piling of the granular material on the receiving means, and a wall across the receiving means having an upper edge curved relative to the shape of the piled material so as to cause an even overflow of material from one end to the other of said wall.

6. In a mechanism of the kind described, a container, an inlet, receiving means for granular material, said receiving means being disposed beneath said inlet to cause piling of the granular material on the receiving means, and a wall across the receiving means having an upper edge curved relative to the shape of the piled material so as to cause an even overflow of material from one end to the other of said wall, together with means mounting said receiving means pivotally in said container.

7. In a mechanism of the kind described, a container, an inlet, receiving means for granular material, said receiving means being disposed beneath said inlet to cause piling of the granular material on the receiving means, and a wall across the receiving means having an upper edge curved relative to the shape of the piled material so as to cause an even overflow of material from one end to the other of said wall, together with means removably mounting said receiving means in said container.

8. In a mechanism of the kind described, a support means, a sloping grid adapted to receive material with insects to be electrocuted, means to adjust the slope of said grid, and means to maintain the grid in a stream of material, including means to introduce the material at the higher end thereof, and means to receive the material from the lower end thereof.

9. In a mechanism of the kind described, a housing, an inlet into said housing, means in the housing to receive material, means on the receiving means to distribute the material in a stream evenly over a predetermined width, electrocuting means supported on the housing, disposed to receive material thus distributed, said electrocuting means having substantial length, and baffle means to maintain the material within the limits of a maximum depth on the electrocuting means.

10. In a mechanism of the kind described, a housing, an inlet in the housing to admit material, an electrocuting means in the housing disposed to receive the material at one of its ends, said electrical means comprising a plurality of grid elements laid parallel, and spacing means holding them apart, two electrical conducting means of opposite polarity, one connected to alternate grid elements, and the other connected to the remaining grid elements.

11. In a mechanism of the kind described, a housing, an inlet therein, an electrocuting means adapted to receive material introduced through the inlet, said electrocuting means comprising a floor with a plurality of oppositely charged, spaced conductors therein, a door in the housing giving access to the electrocuting means, means causing the material to flow across the electrocuting means, discharge means to receive the material from the electrocuting means, and an outlet from the discharge means.

12. In a mechanism of the kind described, a housing, an inlet therein, an electrocuting means adapted to receive material introduced through the inlet, said electrocuting means comprising a floor with a plurality of oppositely charged, spaced conductors therein, a door in the housing giving access to the electrocuting means, means causing the material to flow from one side to the other of the electrocuting means, discharge means to receive the material from the electrocuting means, and an outlet from the discharge means, together with an additional door, and power means on the additional door for connection with the electrocuting means.

13. In a mechanism of the kind described, a housing, an inlet therein, a dead box under the inlet, a plurality of electrocuting means extending radially from the dead box, a wall on the dead box for each electrocuting means, all of said walls being so shaped that each electrocuting means has substantially the same amount of material distributed to it evenly from side to side thereof.

14. In a mechanism of the kind described, a housing, an inlet therein, a dead box under the inlet, a plurality of electrocuting means extending radially from the dead box, a wall on the dead box for each electrocuting means, all of said walls being so shaped that each electrocuting means has substantially the same amount of material distributed to it evenly from side to side thereof, together with valve-controlled discharge means for the dead box for emptying the same.

15. In a mechanism of the kind described, a housing having an inlet to receive grain or the like, a receiver within the housing into which the grain is deposited from the inlet, an electrocuting means comprising a grid having a plurality of conductors thereon, adjacent ones being spaced apart, and oppositely connectible to a source of electricity to provide open circuits, said grid extending a substantial distance across the housing, said receiver having means to distribute the grain evenly across the grid, the grid being higher at one end to receive the grain from the receiver and cause it to flow toward the other end, the spacing of the conductors being such that circuits between them may be closed by the presence of insects in the grain flowing over the grid, the grid being of substantial length, baffle means to keep the grain spread thinly on the grid to insure contact of insects with the conductors during travel of grain across the grid, and discharge means to receive grain from the low part of the grid.

16. In a mechanism of the kind described, a housing, a grid supported therein, an inlet into the housing, a dead box supported on the housing to receive material from the inlet and distribute it across the grid, said box having a wall, and plates adjustably supported on the wall to make the wall have an edge shaped to provide even distribution of the material from the box onto the grid, from one side to the other of said grid.

17. In a mechanism of the kind described, a housing, an inlet at the top thereof, a receiving box in the housing below the inlet, a grid disposed to receive material from the box, means pivoting the receiving box onto the housing so that the same may be upturned to dump its contents onto the grid, said box having a wall over the grid and shaped to cause material flowing over it to be distributed evenly across the grid, said grid providing a floor over which the material may pass, and a plurality of spaced conductors in said floor oppositely charged to provide open electric circuits, said circuits being adapted to be closed by insects in the grain, said grid having side walls and a cover wall between the side walls, to confine the material, and baffle means suspended over the grid to keep the depth of material thereon within a desired maximum.

OBED W. STONE.